L. E. WATERMAN.
RIDING ATTACHMENT FOR HARROWS.
APPLICATION FILED MAY 27, 1912.
1,064,266.
Patented June 10, 1913.
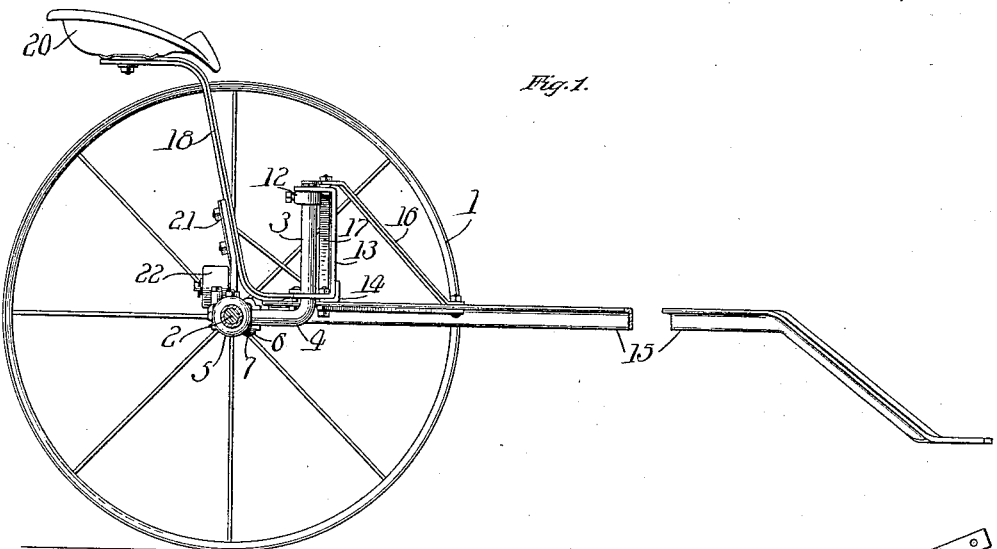
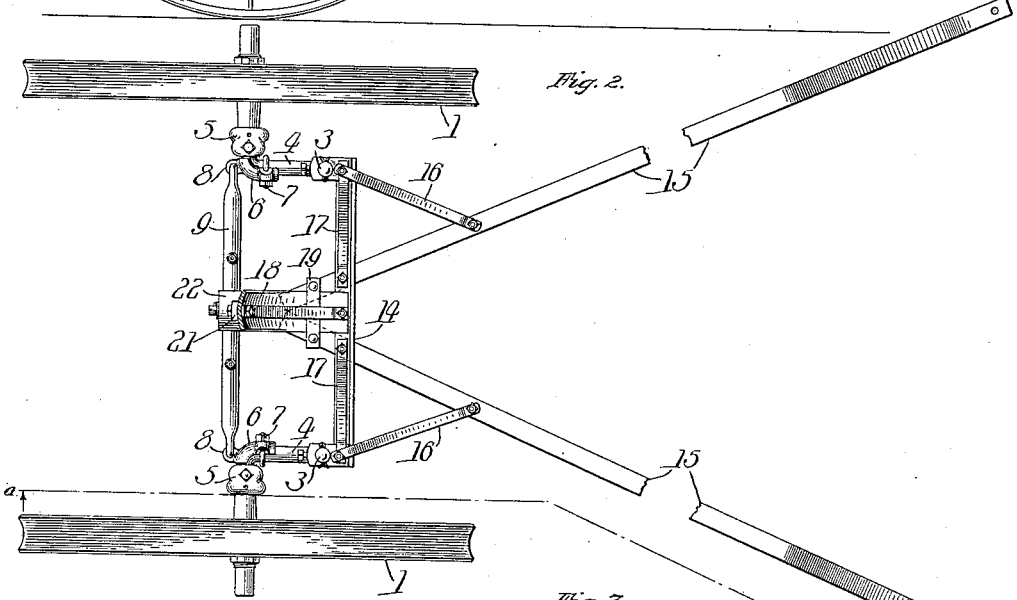
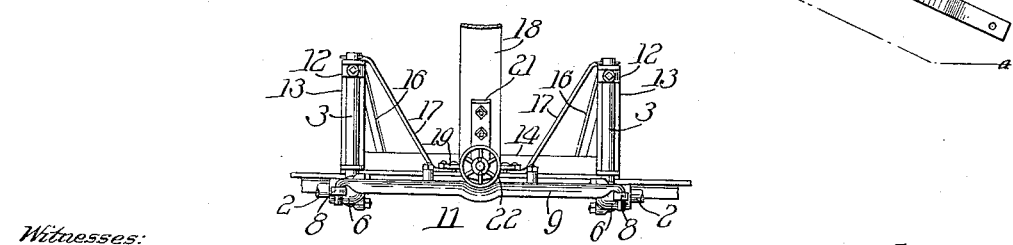
Witnesses:
E. Behel.
John McCanna.
Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

RIDING ATTACHMENT FOR HARROWS.

1,064,266.  Specification of Letters Patent.  Patented June 10, 1913.

Application filed May 27, 1912. Serial No. 700,041.

*To all whom it may concern:*

Be it known that I, LEWIS E. WATERMAN, a citizen of the United States, residing at Rockford, in the county of Winnebago and State of Illinois, have invented certain new and useful Improvements in Riding Attachments for Harrows, of which the following is a specification.

The object of this invention is to construct a riding attachment for harrows in which the supporting wheels are connected in a pivotal manner so that they will turn in unison after overcoming a given resistance.

In the accompanying drawings, Figure 1 is a section on line *a a* Fig. 2. Fig. 2 is a plan view. Fig. 3 is a fragmentary rear view.

The wheels 1 each support a stub axle comprising the horizontal section 2, the vertical section 3 joined to the horizontal section by the forwardly extending section 4. The supporting wheels are connected to the horizontal sections of the axle by the caps 5. At the junction of the sections 2 and 4 of the stub axle is secured a cap 6 by the U bolt 7, and from each cap extends an eye 8. A bar 9 has its depending ends 10 located in the eyes 8 and this bar is formed with a center depression 11 in its upper face. A collar 12 is secured to the upper end of each of the sections 3 of the stub axles and a yoke 13 has its upper end resting on the collar 12 and both ends receiving the vertical section 3 of the stub axle in a pivotal manner.

The yokes are bolted to an angle bar 14 which extends parallel with the bar 9. To the angle bar 14 are bolted two forwardly extending bars 15 and brace bars 16 connect the bars 15 with the upper ends of the yokes 13. Brace bars 17 connect the upper ends of the yokes 13 with the angle bar 14.

A seat support 18 is connected to the angle bar 14 and a cross-brace 19 connects with the seat support and with the bars 15. A seat 20 is connected with the seat support. To the rear face of the seat support 18 is connected a bracket 21 which supports a roller 22 located on a horizontal axis and located in the recess 11 in the upper face of the bar 9.

In use the forward ends of the bars 15 are attached to a harrow and the rider mounted in the seat 20. While the harrow is being drawn forward the roller 22 will rest in the recess 11 which will hold the supporting wheels from casting. In turning a corner the wheels will caster, thereby raising the roller 22 out of the recess 11 and permitting it to ride on the upper face of the bar 9 until the wheels turn into the line of draft when the roller will drop into the recess 11. The weight of the rider holds the roller in the recess and prevents the wheels from casting until a corner is turned.

The bar 9 and the angle bar 14 in connection with the sections 4 of the stub axles form a connection between the supporting wheels so that both wheels will caster in unison and the driver will always face in the direction of the line of draft.

I claim as my invention.

1. A riding attachment for harrows comprising a rectangular frame pivotally connected at its corners, carrying wheels for the ends of said frame, one of the side-bars formed with a recess, attaching-bars connected with the other side of said frame, and means connected to the side-bar opposite said recess supporting a roller adapted to be located in the recess.

2. A riding attachment for harrows comprising a rectangular frame pivotally connected at its corners, carrying-wheels for the ends of the frame, one of the side bars of the frame formed with a recess in its upper face, attaching bars connected with the other side bar of the rectangular frame, a seat bar connected with the last mentioned side bar, and a roller supported by the seat bar and located in the recess.

3. A riding attachment for harrows having a frame comprising end and side-bars, carrying wheels for said end-bars, one of said side-bars forming a pivotal support for the end-bars, draft bars connected with one of the side bars of the frame, the other side-bar forming a pivotal connection between the end-bars and having a recess formed therein, and a roller actuated through movement of said draft-bars and adapted to be located in the recess.

4. A riding attachment for harrows comprising a rectangular frame pivotally connected at its corners, carrying-wheels for the ends of the frame, draft means connected to one of the side-bars of the frame, a recess formed in the other side-bar, and a roller located therein and being actuated by said draft means.

5. A riding attachment for harrows comprising a rectangular frame pivotally connected at its corners, carrying wheels for the ends of the frame, draft means connected to one of the side-bars of the frame, movable engaging means adapted to be actuated by movement of said side-bar, and said movable engaging means adapted to be held yieldingly in engagement with the other side-bar.

6. A riding attachment for harrows comprising a rectangular frame pivotally connected at its corners, carrying-wheels for the ends of the frame, draft means connected to one of the side-bars of the frame, and movable engaging means held in engagement with the other side-bar of the frame and adapted to be moved from said engagement through the movement of said draft means.

7. A riding attachment for harrows having a frame comprising end and side-bars, axles formed with said end-bars and formed with vertical shanks, wheels supporting the axles, one of said side-bars forming a pivotal support for the shanks, draft means having a connection with said side-bar, the other side-bar of the frame having a pivotal connection with the end-bars, and movable engaging means held into engagement with said last mentioned side-bar and adapted to be moved from said engagement through the movement of said draft means.

8. A riding attachment for harrows having a frame comprising end and side-bars, carrying-wheels for the end-bars, one of said side-bars forming a pivotal support for the end-bars, draft means having a connection with said side-bar, the other side-bar of the frame having a pivotal connection with the end-bars, and yieldable means held into engagement with said last mentioned side-bar and adapted to be moved from said engagement through the movement of said draft means.

In testimony whereof I have hereunto set my hand in presence of two subscribing witnesses.

LEWIS E. WATERMAN.

Witnesses:
  A. O. BEHEL,
  E. D. E. N. BEHEL.

---

Copies of this patent may be obtained for five cents each, by addressing the "Commissioner of Patents, Washington, D. C."